Feb. 4, 1930.  W. FERGUSON  1,746,076
DOLLY
Filed May 4, 1928   2 Sheets-Sheet 1

INVENTOR.
William Ferguson,
BY Geo. P. Kimmel
ATTORNEY.

Feb. 4, 1930.                W. FERGUSON                 1,746,076
                                DOLLY
                         Filed May 4, 1928          2 Sheets-Sheet 2

INVENTOR.
William Ferguson,
BY
Geo. P. Kimmel
ATTORNEY.

Patented Feb. 4, 1930

1,746,076

UNITED STATES PATENT OFFICE

WILLIAM FERGUSON, OF FLINT, MICHIGAN

DOLLY

Application filed May 4, 1928. Serial No. 275,219.

This invention relates to a dolly for bending or straightening out sheet metal, but more particularly for use in connection with automobile work for removing dents and bumps in hoods, radiator casings, fenders, etc., and the invention has for its object to provide, in a manner as hereinafter set forth a block of such class capable of being conveniently handled when employed for bumping out metal and further including a plurality of different shaped faces to enable its use for removing indentations from flat surfaces and from curved surfaces of various configurations.

Dollies are constructed to be held against one face of the work to be straightened or bumped out while hammer blows are delivered to the opposite face of the work, and in removing indentations from curved surfaces it is important that the curvature of the portion of the dolly held against the work shall conform closely to the curvature it is desired to impart to the work being bumped out.

The present invention therefore relates to a dolly which is so constructed that different portions of the dolly will conform to the curvature of different portions of the fenders, hood and other sheet metal structure of an automobile to be bumped out and also to a dolly having a handle portion to facilitate holding the dolly firmly in the hand doing the bumping out operations.

The fenders of an automobile due to their position are likely to be bent or indented when a collision or other automobile accident occurs, and while the dolly of the present invention may be used in removing indentations from the sheet metal structure of various portions of an automobile, it is particularly well adapted for use in straightening and bumping out fenders.

A more specific feature of the present invention therefore relates to a dolly having differently curved surfaces adapted to conform to the different curvatures of variously shaped fenders, and in a handle portion for facilitating the holding of the differently curved surfaces of the dolly against the fender.

Further objects of the invention are to provide, in a manner as hereinafter set forth, a dolly which is simple in its construction and arrangement, strong, durable, thoroughly efficient in its use, conveniently handled, capable of being expeditiously positioned with respect to the work to be acted upon, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
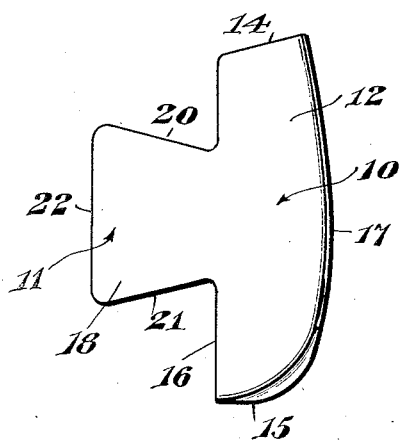
Figure 1 is a side elevation of a dolly in accordance with this invention.
Figure 2:
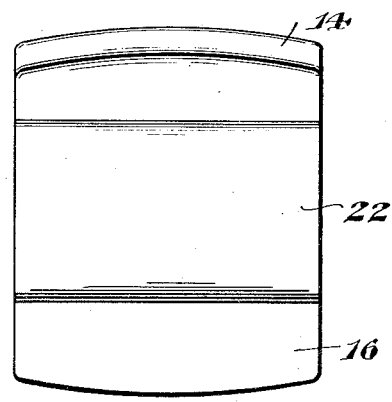
Figure 2 is a rear elevation thereof.
Figure 3:
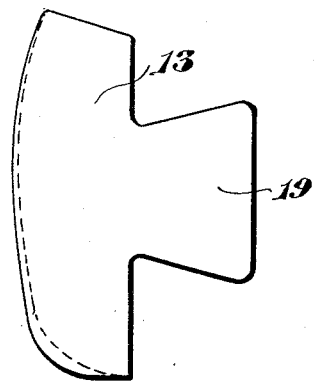
Figure 3 is a view similar to Figure 1 looking toward the opposite side of the dolly.
Figure 4:
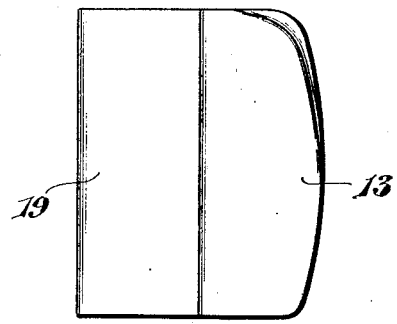
Figure 4 is an end elevation thereof.
Figure 5:
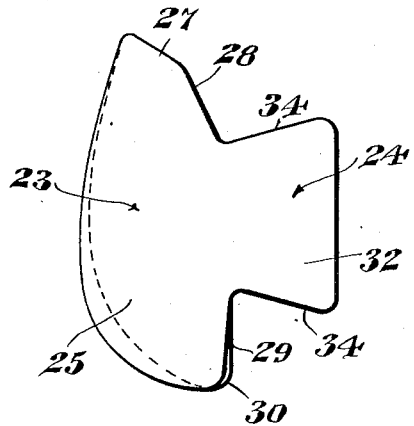
Figure 5 is a side elevation of a modified form of dolly constructed in accordance with this invention.
Figure 6:
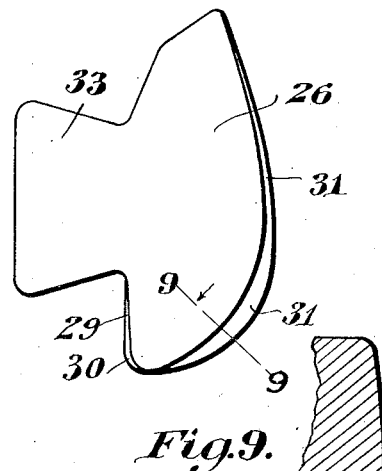
Figure 6 is a view similar to Figure 5 looking toward the other side thereof.
Figure 7:
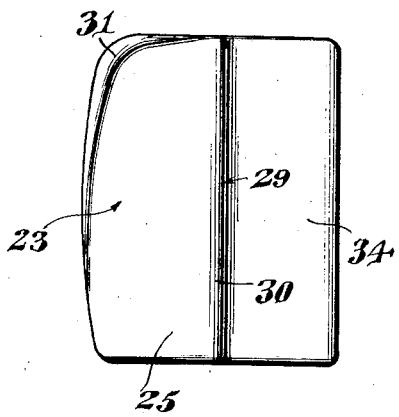
Figure 7 is an end elevation of the form of dolly shown in Figure 5.
Figure 8:
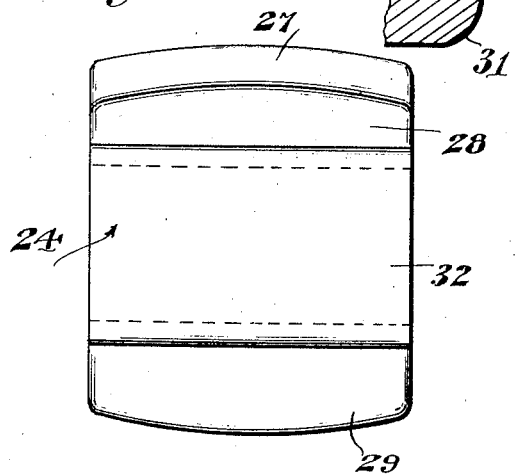
Figure 8 is a rear elevation of the form of dolly shown in Figure 5.

Both forms of dollies are of substantially T-shape, but the dolly of Figs. 5 to 8 inclusive is designed for use upon surface of more pronounced curvatures than the dolly of Figs. 1 to 4 inclusive.

Referring to Figures 1 to 4 of the drawings the dolly comprises a head referred to generally at 10 and a shank or handle referred to generally at 11.

The head 10 is substantially rectangular and is provided with the opposite side faces 12, 13, the face 13 being of greater width throughout than the face 12. One end of the head 10 is disposed at an outward inclination as indicated at 14 and the other end of the head 10 is rounded as indicated at 15. The inner face or bottom of the head 10 is squared as indicated at 16. The forward or working face of the head 10 is curved lengthwise and slopes transversely from the side 13 to the side 12 upon an arc. The forward bumping-out face of the head 10 is indicated at 17. As the face 17 slopes from the side 13 to the side 12 transversely, the side 12 is of less width than the side 13. The end 15 slopes transversely from the side 13 to the side 12 and the sloping portion is upon an arc.

The stem or handle 11 has its side faces 18, 19 flush with the side faces 12, 13 of the head 10. The faces 18 and 19 are flat. The shank, stem or handle 11 decreases in width toward the inner face or bottom 16 of the head by disposing the faces 20, 21 thereof at an inward inclination. This is desirable as it permits the handle 11 to be more firmly held in the hand.

The arc upon which the face 17 slopes from the face 13 to the face 12 towards the end 14 is less than the arc upon which the end 15 slopes from the face 13 to the face 12, and the curvature of the arc of the face 17 gradually increases from the end 14 to the end 15. The face 17 is curved lengthwise and transversely upon an arc of convex curvature longitudinally and transversely and the end 15 is also curved longitudinally and transversely.

The face 17, ends 14, 15 and sides 12, 13 of the head 10 are all adapted for use in bumping out different surfaces. The slightly curved portion of the face 17 is adapted to be held against the surface of a piece of work having a similar slight curve, while the end portion 15 and rounded curve between the end portion 15 and face 17 may be used in removing indentations from similarly curved portions of an automobile. The flat side faces 12 and 13 are adapted for use in straightening or removing indentations from flat surfaces. The end 14 and edge formed by the meeting of the surface 17 and end 14 may be used in bumping out portions disposed at angles of less than 90 degrees to each other.

Figure 9:
Figure 9 is a section on line 9—9 of Figure 6.

Referring to Figures 5 to 9 of the drawings the head of the dolly is indicated at 23 and the handle, shank or stem at 24. The head 23 is provided with a pair of flat side faces 25, 26, an end face 27 disposed at an inward inclination, and a bottom face formed of two portions 28, 29, the former disposed at an upward inclination from its inner end and the latter depending at an inclination from the side face 26 to the side face 25 and which is indicated at 29. The head 23 in side elevation is substantially of segmental contour and the forward working face of the head 23, indicated at 31 slopes from the face 25 to the face 26 upon an arc disposed transversely with respect to the face 31 and with the arc gradually decreasing from the end 27 of the head 23 to the sloping part 30 of the portion 29 of the bottom of the head 23.

The handle 24 is of tapered contour and has the faces 32, 33 thereof flush with the faces 25, 26 respectively. The sides 34 of the handle 24 are inwardly inclined to afford the hand a better grip and one merges into the inner end of the portion 28 of the bottom of the head 23 and the other merges into the portion 29 of the bottom of the head 23. The end 27 is squared as well as the portion 28 of the bottom of the head 23.

The end 27, portions 28, 29, face 31 and faces 25 and 26 of the head 23 can be employed for metal working and the faces 32, 33 and 34 of the handle 24 can also be employed for metal working purposes, but preferably the forward or main working face 31 of the head 23 is employed for metal working purposes.

In this modified construction as in the construction of Figs. 1 to 4 inclusive the end 27, curved surfaces 30, 31 and flat surfaces 25, 26 may be employed in bumping out operations and since the curvature of the surface 31 is greater than that of the surface 17 the modified construction of Figs. 5 to 9 inclusive is adapted for use in bumping out fenders and other surfaces have more pronounced curves than the work upon which the dolly of Figs. 1 to 4 inclusive is designed to be used.

The two dollies herein shown and described are provided with variously curved faces that are carefully designed to fit a maximum number of curved surfaces to be bumped out.

The handle of each of the dollies permits the same being conveniently positioned and held against the work to be bumped out.

What I claim is:

1. A dolly comprising a substantially T-shaped unit providing a rectangular head and a handle, said head including an inner and an outer face and a pair of side faces, one of greater width throughout than the other, the said outer face sloping throughout from the outer longitudinal edge of the side face of greatest width to the outer longitudinal edge of the other side face, and said handle being integral with said inner face transversely of and centrally of the latter.

2. A dolly comprising a substantially T-shaped unit providing a rectangular head and a handle, said head including an inner and an outer face and a pair of side faces, one of greater width throughout than the other, the said outer face sloping throughout from the outer longitudinal edge of the side face of greatest width to the outer longitudinal edge of the other side face, said handle being integral with said inner face transversely of and centrally of the latter, and said handle being flush with said side faces and having a pair of opposed faces inclining towards each other from their outer to their inner ends.

3. A dolly comprising a substantially T-shaped unit providing a rectangular head and a handle, said head including an inner and an outer face and a pair of side faces, one of greater width throughout than the other, the said outer face sloping throughout from the outer longitudinal edge of the side face of greatest width to the outer longitudinal edge of the other side face, said handle being integral with said inner face transversely of and centrally of the latter, said head further including a pair of end faces, one of said end faces sloping throughout from an end edge of the side face of greatest width to the adjacent end edge of said other side face, and said other end edge inclining outwardly from one end edge of said inner face to the adjacent end edge of said outer face.

4. A dolly comprising a substantially T-shaped unit providing a rectangular head and a handle, said head including an inner and an outer face and a pair of side faces, one of greater width throughout than the other, the said outer face sloping throughout from the outer longitudinal edge of the side face of greatest width to the outer longitudinal edge of the outer side face, said handle being integral with said inner face transversely of and centrally of the latter, said head further including a pair of end faces, one of said end faces sloping throughout from an end edge of the side face of greatest width to the adjacent end edge of said other side face, said other end edge inclining outwardly from one end edge of said inner face to the adjacent end edge of said outer face, and said handle being flush with said side faces and having a pair of opposed faces inclining towards each other from their outer to their inner ends.

5. A dolly comprising a substantially T-shaped unit providing a rectangular head and a handle, said head including an inner and an outer face and a pair of side faces, one of greater width throughout than the other, the said outer face sloping throughout from the outer longitudinal edge of the side face of greatest width to the outer longitudinal edge of the other side face, said handle being integral with said inner face transversely of and centrally of the latter, and said handle spaced from the ends of the inner face of the head.

6. A dolly comprising a substantially T-shaped unit providing a rectangular head and a handle, said head including an inner and an outer face and a pair of side faces, the said outer face sloping throughout from the outer longitudinal edge of one side face to the outer longitudinal edge of the other side face, said handle being integral with said inner face transversely of and centrally of the latter, said head further including a pair of end faces, one of said end faces sloping throughout from an end edge of one side face to the adjacent end edge of the other side face, said other end edge inclining outwardly from one end edge of said inner face to the adjacent end edge of said outer face, and said handle spaced from the ends of the inner face of the head.

7. A dolly comprising a substantially T-shaped unit providing a rectangular head and a handle, said head including an inner and an outer face and a pair of side faces, the said outer face slopping throughout from one side face to the other side face, said handle being integral with said inner face transversely of and centrally of the latter, and said sloping outer face of the head being of convex curvature in the direction of the length and width thereof.

8. A dolly comprising a substantially T-shaped unit providing a rectangular head and a handle, said head including an inner and an outer face and a pair of side faces, one of greater width throughout than the other, the said outer face sloping throughout from the outer longitudinal edge of the side face of greatest width to the outer longitudinal edge of the other side face, said handle being integral with said inner face transversely of and centrally of the latter, said handle being flush with said side faces and having a pair of opposed faces inclining towards each other from their outer to their inner ends, and said sloping outer and end faces of the head being of convex curvature in the direction of the length and width thereof.

9. A dolly comprising a substantially T-shaped unit providing a rectangular head and a handle, said head including an inner and an outer face and a pair of side faces, one of greater width throughout than the other, the said outer face sloping throughout from the outer longitudinal edge of the side face of greatest width to the outer longitudinal edge of the other side face, said handle being integral with said inner face transversely of and centrally of the latter, said handle spaced from the ends of the inner face of the head, and said sloping outer and end faces of the head being of convex curvature in the direction of the length and width thereof.

10. A dolly comprising a substantially T-shaped unit providing a rectangular head and a handle, said head including an inner and an outer face and a pair of side faces, one of greater width throughout than the other, the said outer face sloping throughout from the outer longitudinal edge of the side face of greatest width to the outer longitudinal edge of the other side face, said handle being integral with said inner face transversely of and centrally of the latter, said head further including a pair of end faces, one of said end faces sloping throughout from an end edge of the side face of greatest width to the adjacent end edge of said other side face, said other end edge inclining outwardly from one end edge of said inner face to the adjacent end edge of said outer face, said handle spaced from the ends of the inner face of the head, and said sloping outer and end faces of the head being of convex curvature in the direction of the length and width thereof.

11. A dolly comprising a substantially T-shaped unit providing a rectangular head and a handle, said head including an inner and an outer face and a pair of side faces, one of greater width throughout than the other, the said outer face sloping throughout from the outer longitudinal edge of the side face of greatest width to the outer longitudinal edge of the other side face, said handle being integral with said inner face transversely of and centrally of the latter, and said handle spaced from the ends of the inner face of the head, the arc upon which said outer face of the head slopes being different from that upon which one end of the head slopes.

12. A dolly comprising a substantially T-shaped unit providing a rectangular head and a handle, said head including an inner and an outer face and a pair of side faces, one of greater width throughout than the other, the said outer face sloping throughout from the outer longitudinal edge of the side face of greatest width to the outer longitudinal edge of the other side face, said handle being integral with said inner face transversely of and centrally of the latter, said head further including a pair of end faces, one of said end faces sloping throughout from an end edge of the side face of greatest width to the adjacent end edge of said other side face, said other end edge inclining outwardly from one end edge of said inner face to the adjacent end edge of said outer face, and said handle spaced from the ends of the inner face of the head, the arc upon which said outer face of the head slopes being different from that upon which one end of the head slopes.

13. A dolly comprising a combined bumping head and rib-like handle merging into the inner face of the head and disposed transversely of and centrally of the head, and the outer face of the head being provided with a convex bumping surface extending from one end of the head towards the other.

14. A dolly comprising a combined bumping head and rib-like handle merging into the inner face of the head and disposed transversely of and centrally of the head, and the outer face of the head being provided with a bumping surface having a convex curvature extending both longitudinally and transversely of the head.

15. A dolly comprising a combined bumping head and rib-like handle merging into the inner face of the head and disposed centrally of the head and the outer face of the head being provided with a convex bumping surface extending from one end of the head to the other and having one end rounded so that its curved surface merges into the curved surface of said outer face.

16. A dolly comprising a combined bumping head and rib-like handle merging into the inner face of the head and disposed centrally of the head, and the outer face of the head being provided with a convex bumping surface extending from one end of the head to the other and having one end rounded and an angularly disposed shoulder at its opposite end.

17. A dolly comprising a combined bumping head and rib-like handle merging into the inner face of the head and disposed centrally of the head and having the thickness of the side walls of the handle increased in an outward direction from the head, and the outer face of the head being provided with a curved bumping surface.

In testimony whereof, I affix my signature hereto.

WILLIAM FERGUSON.